US012511149B2

(12) United States Patent
Brown, Jr. et al.

(10) Patent No.: US 12,511,149 B2
(45) Date of Patent: Dec. 30, 2025

(54) FACILITATING SHARING OF A NAMESPACE OF AN EPHEMERAL STORAGE DEVICE BY MULTIPLE CONSUMERS OF A VIRTUAL STORAGE SYSTEM

(71) Applicant: NetApp, Inc., San Jose, CA (US)

(72) Inventors: Joseph Brown, Jr., Raleigh, NC (US); Javier Tsuyoshi Takimoto, Missouri City, TX (US); Sangramsinh Pandurang Pawar, Bedford, MA (US); Michael Scott Ryan, Wake Forest, NC (US)

(73) Assignee: NetApp, Inc., San Jose, CA (US)

( * ) Notice: Subject to any disclaimer, the term of this patent is extended or adjusted under 35 U.S.C. 154(b) by 334 days.

(21) Appl. No.: 18/309,148

(22) Filed: Apr. 28, 2023

(65) Prior Publication Data

US 2024/0362056 A1 Oct. 31, 2024

(51) Int. Cl.
*G06F 9/455* (2018.01)

(52) U.S. Cl.
CPC ............ *G06F 9/45558* (2013.01); *G06F 2009/45579* (2013.01); *G06F 2009/45583* (2013.01)

(58) Field of Classification Search
CPC ....... G06F 9/45558; G06F 2009/45579; G06F 2009/45583
See application file for complete search history.

(56) References Cited

U.S. PATENT DOCUMENTS

| 9,684,532 B2 | 6/2017 | Usgaonkar et al. |
| 12,189,972 B2 | 1/2025 | Brown, Jr. et al. |
| 2016/0055018 A1 | 2/2016 | Usgaonkar et al. |
| 2016/0210199 A1 | 7/2016 | Christensen et al. |
| 2019/0042144 A1 | 2/2019 | Peterson et al. |
| 2019/0050289 A1 | 2/2019 | Kachare et al. |

(Continued)

FOREIGN PATENT DOCUMENTS

EP 3608770 A1 2/2020

OTHER PUBLICATIONS

Non-Final Office Action mailed on Dec. 17, 2024 for U.S. Appl. No. 18/168,844, filed Feb. 14, 2023, 09 pages.

(Continued)

*Primary Examiner* — Gregory A Kessler
(74) *Attorney, Agent, or Firm* — Jaffery Watson Hamilton & DeSanctis LLP

(57) ABSTRACT

Systems and methods for sharing a namespace of an ephemeral storage device by multiple consumers are provided. In an example, an NVMe driver of a virtual storage system deployed within a compute instance of a cloud environment facilitates sharing of the namespace by exposing an API through which the multiple consumers access an ephemeral storage device associated with the compute instance. During initialization processing performed by each consumer, for example, during boot processing of the virtual storage system, the consumers may share the namespace by reserving for their own use respective partitions within the namespace via the API and thereafter restrict their usage of the namespace to their respective partitions, thereby retaining the functionality provided by the multiple consumers when the host on which the compute instance is deployed has fewer ephemeral storage devices than consumers that rely on the availability of vNVRAM backed by ephemeral storage.

20 Claims, 10 Drawing Sheets

(56) References Cited

U.S. PATENT DOCUMENTS

2022/0350489 A1 11/2022 Kanno
2023/0367677 A1 11/2023 Pawar et al.

OTHER PUBLICATIONS

Notice of Allowance mailed on Aug. 29, 2024 for U.S. Appl. No. 18/309,162, filed Apr. 28, 2023, 7 pages.
Notice of Allowance mailed on Mar. 12, 2025 for U.S. Appl. No. 18/360,221, filed Jul. 27, 2023, 09 pages.
Notice of Allowance mailed on Mar. 31, 2025 for U.S. Appl. No. 18/168,844, filed Feb. 14, 2023, 05 pages.
Co-pending U.S. Appl. No. 17/703,307, inventors Pawar; Sangramsinh Pandurang et al., filed on Mar. 24, 2022.
Co-pending U.S. Appl. No. 18/168,844, inventors Sangramsinh; Pandurang Pawar et al., filed on Feb. 14, 2023.
Co-pending U.S. Appl. No. 18/309,162, inventor Brown Jr.; Joseph , filed on Apr. 28, 2023.
Notice of Allowance mailed on Apr. 28, 2023 for U.S. Appl. No. 17/703,307, filed Mar. 24, 2022, 9 pages.

FACILITATING SHARING OF A NAMESPACE OF AN EPHEMERAL STORAGE DEVICE BY MULTIPLE CONSUMERS OF A VIRTUAL STORAGE SYSTEM

BACKGROUND

Field

Various embodiments of the present disclosure generally relate to virtual storage systems. In particular, some embodiments relate to an approach for sharing backing storage represented by an ephemeral storage device by multiple consumers (e.g., operation log journaling and maintenance of a victim cache) of a virtual storage system.

Description of the Related Art

When a file system of a storage system, such as a storage server computing device, receives a write request, it commits the data to permanent storage before the request is confirmed to the writer. Otherwise, if the storage system were to experience a failure with data only in volatile memory, that data would be lost, and underlying file structures could become corrupted. Physical storage appliances commonly use battery-backed high-speed non-volatile random access memory (NVRAM) as a journaling storage media to journal writes and accelerate write performance while providing permanence, because writing to memory is much faster than writing to storage (e.g., disk). Storage systems may also implement a buffer cache in the form of an in-memory cache to cache data that is read from data storage media (e.g., local mass storage devices or a storage array associated with the storage system) as well as data modified by write requests. In this manner, in the event a subsequent access relates to data residing within the buffer cache, the data can be served from local, high performance, low latency storage, thereby improving overall performance of the storage system. The modified data may be periodically (e.g., every few seconds) flushed to the data storage media. As the buffer cache is limited in size, an additional cache level may be provided by a victim cache, typically implemented within a slower memory or storage device than utilized by the buffer cache, that stores data evicted from the buffer cache.

The event of saving the modified data to the mass storage devices may be referred to as a consistency point (CP). At a CP point, the file system may save any data that was modified by write requests to persistent data storage media. When operating in high-availability (HA) mode (e.g., a mode in which one node of a cluster of nodes represents a primary storage system for a dataset and another node of the cluster represents a secondary storage system that maintains a mirrored dataset to support failover), the CP point may also trigger a process of updating the mirrored dataset on the HA partner. As will be appreciated, when using a buffer cache, there is a small risk of a system failure occurring between CPs, causing the loss of data modified after the last CP. Consequently, the storage system may maintain an operation log or journal of certain storage operations within the journaling storage media that have been performed since the last CP. This log may include a separate journal entry (e.g., including an operation header) for each storage request received from a client that results in a modification to the file system or data. Such entries for a given file may include, for example, "Create File," "Write File Data," and the like.

Depending upon the operating mode or configuration of the storage system, each journal entry may also include the data to be written according to the corresponding request. The journal may be used in the event of a failure to recover data that would otherwise be lost. For example, in the event of a failure, it may be possible to replay the journal to reconstruct the current state of stored data just prior to the failure.

When a storage system is hosted in a cloud environment, the storage system may be referred to as a "virtual storage system." In cloud environments, there is no availability of non-volatile memory or persistent storage having the performance characteristics of NVRAM and instead ephemeral storage physically attached to the host of the compute instance in which the virtual storage system is running may be used.

The nonvolatile memory express (NVMe) protocol may be used to access flash storage (e.g., solid-state drives (SSDs)) via a peripheral component interconnect (PC) Express (PCIe) bus, which supports tens of thousands of parallel command queues and thus is much faster than hard disks and traditional all-flash architectures, which are limited to a single command queue.

For NVMe, storage targets are called "namespaces" (which are analogous to logical unit numbers (LUNs) for fibre channel (FC) and Internet Small Computer System Interface (iSCSI) protocols). An NVMe namespace is a quantity of non-volatile storage that can be formatted into logical blocks and presented to a host as a standard block device. The typical use case is for a single consumer to be mapped to a single namespace.

SUMMARY

Systems and methods are described for sharing a namespace of an ephemeral storage device by multiple consumers. According to one embodiment, a non-volatile memory express (NVMe) driver of a virtual storage system deployed within a compute instance of a cloud environment, exposes an application programming interface (API) through which multiple consumers of the virtual storage system access an ephemeral storage device associated with the compute instance. Sharing of a namespace of the ephemeral storage device is facilitated by: (i) the NVMe driver reserving a first partition within the namespace to be used as a backing store by a first consumer of the multiple consumers based on a first reservation request received via the API from the first consumer; and (i) the NVMe driver reserving a second partition within the namespace to be used as a backing store by a second consumer of the multiple consumers based on a second reservation request received via the API from the second consumer.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
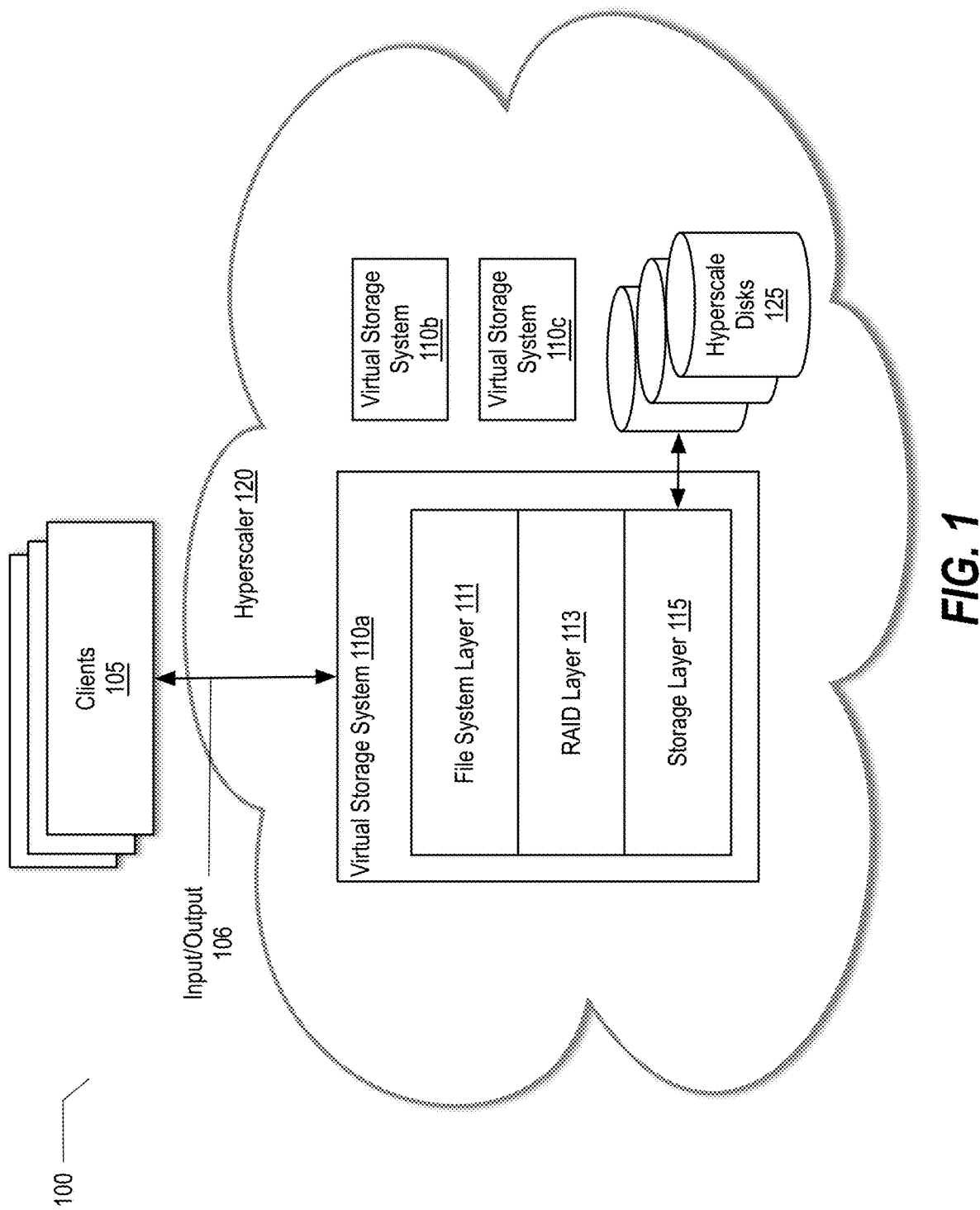
FIG. 1 is a block diagram illustrating an environment in which various embodiments may be implemented.

Systems and methods are described for sharing a namespace of an ephemeral storage device by multiple consumers. As noted above, the typical use case for utilization of a namespace of an ephemeral storage device involves a single consumer being mapped to the namespace. As a result of the limitations of this traditional usage model, in the context of a virtual storage system that runs within a compute instance (e.g., virtual machine (VM) or container) of a less capable host (e.g., a host having or attached directly to a single ephemeral storage device), the functionality performed by one or more of multiple consumers of the virtual storage system that are dependent upon ephemeral storage may be degraded or lost entirely. For example, assuming a virtual storage system includes various drivers (e.g., a journaling driver and a victim cache driver, supporting a journaling subsystem and a victim cache subsystem, respectively) that rely on the availability of "virtual NVRAM" storage or "vNVRAM" backed by ephemeral storage to persist data (e.g., an operation log journal or a victim cache), only one of such consumers would be capable of utilizing the vNVRAM when only a single ephemeral storage device is available as the backing store.

In order to preserve the functionality of multiple consumers of a virtual storage system running in an environment in which only a single ephemeral storage device is available, various embodiments described herein facilitate sharing of a namespace of an ephemeral storage device by multiple consumers. As described further below, according to one embodiment, a non-volatile memory express (NVMe) driver of a virtual storage system deployed within a compute instance of a cloud environment exposes an application programming interface (API) through which the multiple consumers access an ephemeral storage device associated with the compute instance. During initialization processing performed by each consumer, for example, during boot processing of the virtual storage system, the consumers may share a namespace of the ephemeral storage device by reserving for their own use respective partitions within the namespace via the API. Depending on the particular implementation, one consumer may be prioritized over another. For example, the journal driver may be prioritized over the victim cache driver by allowing the journal driver to make use of the entirety of the ephemeral storage device when the amount of space configured for use by an operation log journal that is to be maintained by journal driver is greater than or equal to the size of the namespace. When the namespace is greater than the maximum size of the operation log journal, the journal driver may use the API to enable sharing of the namespace, reserve a partition of the namespace for its use, and leave the remaining portion of the namespace for use by the victim cache driver to maintain a victim cache for storage of buffers evicted from a buffer cache. In addition, input/output (I/O) operations performed by one consumer may be prioritized over another. For example, write operations performed by the journal driver may be given priority over read operations performed by the victim cache driver.

While in the context of various examples described herein by convention partitions reserved within a shared namespace starting at LBA (or sector) 0 of the and each subsequently reserved partition is starts at an offset based on the size of all previously reserved partitions, it is to be appreciated the methodologies described herein are equally applicable to a convention in which partitions are reserved within the shared namespace starting at the last LBA.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein an "ephemeral storage device," "ephemeral storage" or an "ephemeral disk" generally refers to storage that is physically attached to the same host on which a compute instance is running and which is present during the running lifetime of the compute instance. For example, ephemeral storage may represent one or more internal or external hard-disk drives (HDDs and/or solid-state drives (SSDs) of the physical host that are directly attached (i.e., without going through one or more intermediate devices of a network) to the physical host though an interface (e.g., Small Computer System Interface (SCSI), Serial Advanced Technology Attachment (SATA), Serial-Attached SCSI (SAS), FC or Internet SCSI (iSCSI)). Ephemeral storage is not networked. That is, there are no connections through Ethernet or FC switches as is the case for network-attached storage (NAS) or a storage area network (SAN). Non-limiting examples of ephemeral storage include an Elastic Compute Cloud (EC2) instance store in the context of Amazon Web Services (AWS), an ephemeral operating system (OS) disk in the context of Microsoft Azure, and ephemeral disks (local SSD) in the context of Google Cloud Platform (GCP). As noted above, in the event a compute instance goes down due to an underlying recoverable host error, it is assumed herein that the cloud service provider will bring up the compute instance on the same host, thereby maintaining access to data (e.g., an operation log or journal) stored or otherwise flushed to the ephemeral storage by a virtual storage system associated with the compute instance.

As used herein "virtual NVRAM" or "vNVRAM" generally refers to a storage or memory used in place of NVRAM when such memory is unavailable. In various embodiments described herein, vNVRAM utilized by multiple consumers of a virtual storage system is backed by ephemeral storage.

As used herein an "operation log journal," an "operation log," a "journal," an "NV operation log" or the like generally refers to a data structure in which journal entries, for example, including metadata (e.g., headers) of I/O operations and potentially data associated with the I/O operations are stored. As noted above, the journal may include metadata and/or data regarding certain storage operations that have been performed since the last CP to facilitate recovery, for example, from a system failure. For example, the journal may be used to facilitate performance of vNVRAM (or NV log or operation log) replay to recover data, facilitate maintaining data synchronization between HA partners and/or returning to HA mode after one of the HA partners recovers from a failure.

Example Operating Environment

FIG. 1 is a block diagram illustrating an environment 100 in which various embodiments may be implemented. In various examples described herein, a virtual storage system 110a, which may be considered exemplary of virtual storage systems 110b-c, may be run (e.g., on a VM or as a containerized instance, as the case may be) within a public cloud provided by a public cloud provider (e.g., hyperscaler 120). One or more of virtual storage systems 110a-c may be configured to operate as a cluster representing a distributed storage system.

In the context of the present example, the virtual storage system 110a makes use of storage (e.g., hyperscale disks 125) provided by the hyperscaler, for example, in the form of solid-state drive (SSD) backed and/or hard-disk drive (HDD) backed disks. The cloud disks (which may also be referred to herein as cloud volumes, storage devices, or simply volumes or storage) may include persistent storage (e.g., disks) and/or ephemeral storage (e.g., disks).

The virtual storage system 110a may present storage over a network to clients 105 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 105 may request services of the virtual storage system 110a by issuing Input/Output requests 106 (e.g., file system protocol messages (in the form of packets) over the network). A representative client of clients 105 may comprise an application, such as a database application, executing on a computer that "connects" to the virtual storage system 110 over a computer network, such as a point-to-point link, a shared local area network (LAN), a wide area network (WAN), or a virtual private network (VPN) implemented over a public network, such as the Internet.

In the context of the present example, the virtual storage system 110a is shown including a number of layers, including a file system layer 111 and one or more intermediate storage layers (e.g., a RAID layer 113 and a storage layer 115). These layers may represent components of data management software (not shown) of the virtual storage system 110. The file system layer 111 generally defines the basic interfaces and data structures in support of file system operations (e.g., initialization, mounting, unmounting, creating files, creating directories, opening files, writing to files, and reading from files). A non-limiting example of the file system layer 111 is the Write Anywhere File Layout (WAFL) Copy-on-Write file system (which represents a component or layer of ONTAP software available from NetApp, Inc. of San Jose, CA).

The RAID layer 113 may be responsible for encapsulating data storage virtualization technology for combining multiple hyperscale disks 125 into RAID groups, for example, for purposes of data redundancy, performance improvement, or both. The storage layer 115 may include storage drivers for interacting with the various types of hyperscale disks 125 supported by the hyperscaler 120. Depending upon the particular implementation the file system layer 111 may persist data to the hyperscale disks 125 using one or both of the RAID layer 113 and the storage layer 115.

The various layers described above, the drivers described below with reference to FIG. 3, and the processing described below with reference to the flow diagrams of FIGS. 4-9 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., hosts, servers, blades, network storage systems or appliances, and storage arrays, such as the computer system described with reference to FIG. 10 below.

Example Host

Figure 2:
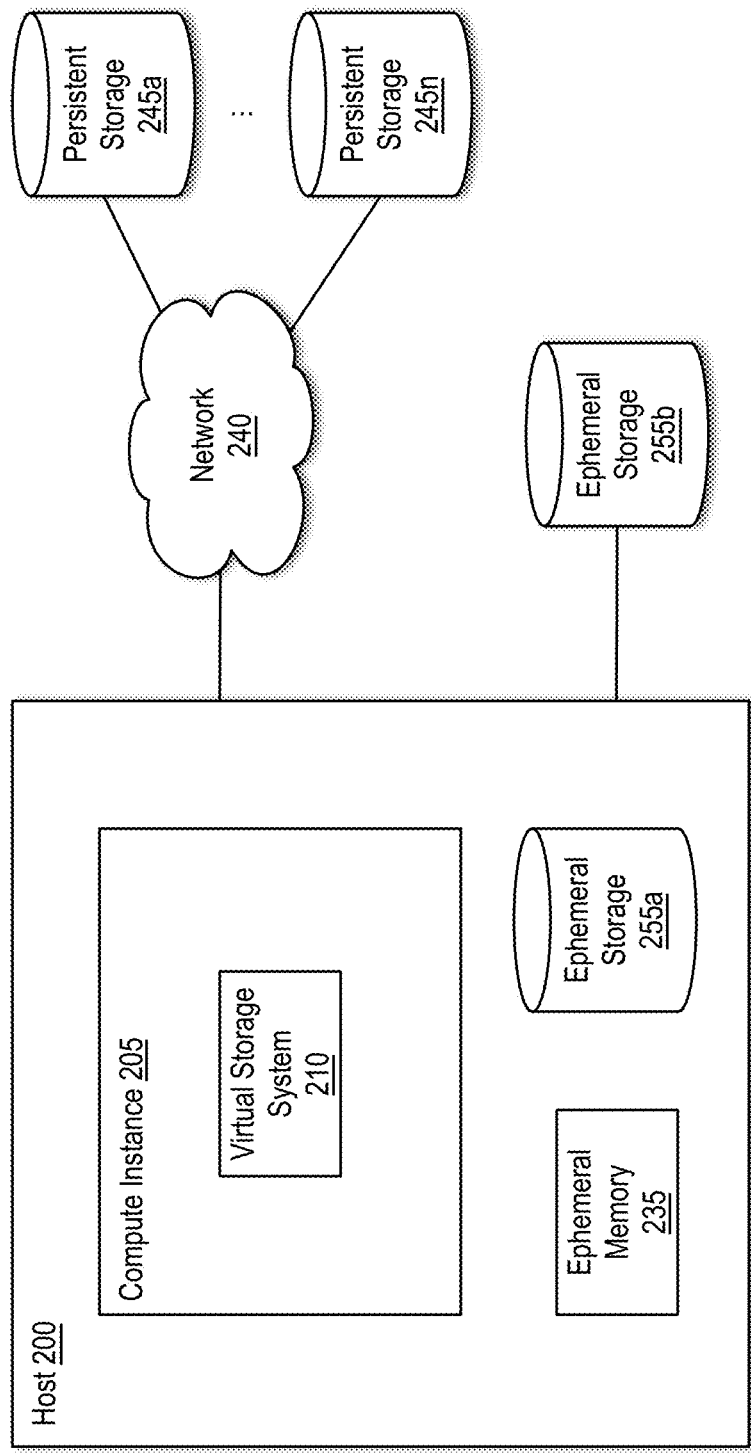
FIG. 2 is a block diagram conceptually illustrating a host of a cloud environment in accordance with an embodiment of the present disclosure.

FIG. 2 is a block diagram conceptually illustrating a host 200 of a cloud environment in accordance with an embodiment of the present disclosure. In the context of the present example, host 200 may represent a physical host (e.g., a server computer system) on which a compute instance 205 (e.g., a container or a VM) may be run in a cloud environment provided by a cloud service provider (e.g., hyperscaler 120). In one embodiment, a virtual storage system 210 (which may be analogous to one of virtual storage systems 110a-c) may perform a boot process to discover ephemeral storage (e.g., ephemeral storage 255a-b) associated with the compute instance 205. As described further below, depending on the amount of space available, a namespace of a discovered ephemeral storage device may be shared by multiple consumers. For example, the discovered ephemeral storage device may be used as backing storage for operation log journaling performed by the virtual storage system 210 via a journaling driver, a victim cache of the virtual storage system 210 maintained by a victim cache subsystem via a victim cache driver, or both.

Existing virtual storage systems may make use of persistent storage (e.g., persistent storage 245a-n) and/or ephemeral memory 235 of the host 200 as backing storage for performance of operation log journaling and/or maintenance of a victim cache (not shown). The use of persistent storage as the journaling storage media generally gives rise to relatively lower write speeds as compared to the use of ephemeral memory 235 as the journal storage media as a result of the persistent storage (e.g., one or more network attached hyperscale disks representing HDDs and/or SSDs) being indirectly attached to the host 200 via a network (e.g., network 240) within the cloud environment whereas use of the ephemeral memory 235 (e.g., a portion of random access memory (RAM) of the host 200) provides less data durability due to the volatile nature.

Rather than making use of persistent storage or ephemeral memory 235, in the context of various examples described herein, ephemeral storage is used as the primary backing storage for one or both of an operation log and the victim cache to preserve (across various host failure recovery scenarios) the metadata and/or data regarding those storage operations resulting in a modification to the file system or data that have been performed since the last CP.

Ephemeral storage may represent direct-attached-storage (DAS) to host 200 in the form of one or more internal (e.g., ephemeral storage 255a) and/or external (e.g., ephemeral storage 255b) storage devices, such as HDDs and/or SSDs, to host 200. In the context of the present example, ephemeral storage is directly attached to host 200 through a physical host interface (e.g., SCSI, SATA, or SAS)). That is, the ephemeral storage is not networked and traffic exchanged between the host 200 and the ephemeral storage does not pass through any intermediate network devices associated with the cloud environment.

During runtime the operation log may be maintained within vNVRAM memory. The vNVRAM memory may represent a local memory (e.g., ephemeral memory 235) of the host 200. In one embodiment, in order to avoid data loss in various shutdown or reboot scenarios, persistent storage (e.g., a designated area of a boot disk) may be used as a backup storage media to the ephemeral storage by flushing the vNVRAM memory (e.g., including the operation log and the victim cache) to both persistent storage and ephemeral storage responsive to receipt of a signal by the virtual storage system indicative of an imminent shutdown or reboot.

Example Virtual Storage System

Figure 3:
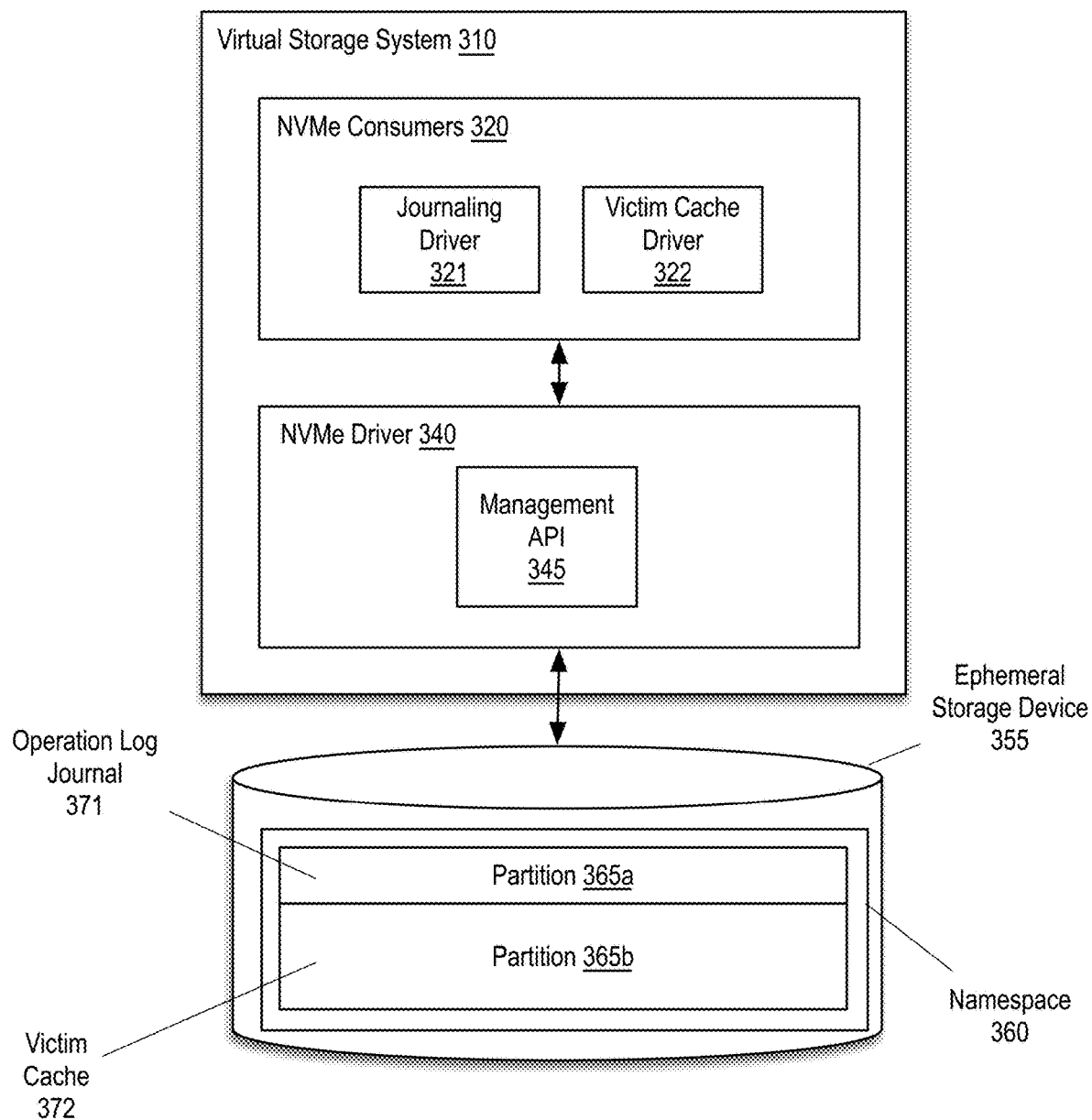
FIG. 3 is a block diagram conceptually illustrating a virtual storage system and an ephemeral storage device in accordance with an embodiment of the present disclosure.

FIG. 3 is a block diagram conceptually illustrating a virtual storage system 310 and an ephemeral storage device 355 in accordance with an embodiment of the present disclosure. For brevity, clarity, and ease of understanding, various of the details discussed above with reference to FIGS. 1-2 may not be discussed or repeated.

In the context of the present example, the virtual storage system 310 (which may be analogous to one of virtual storage systems 110a-c and/or virtual storage system 210), is shown including multiple NVMe consumers 320 (e.g., journaling driver 321 and victim cache driver 322) and an NVMe driver 340. Also shown is an ephemeral storage device 355 (which may be analogous to ephemeral storage 255a or ephemeral storage 255b) that may be associated with a compute instance (e.g., compute instance 205) within which the virtual storage system 310 is deployed.

According to one embodiment, the NVMe consumers 320 access ephemeral storage device 355 indirectly via the NVMe driver 340, which interacts with an NVMe controller (not shown) collocated with the ephemeral storage device 355. The NVMe consumers 320 may invoke various methods/functions of a management API 345 exposed by the NVMe driver 340 to, among other things, share a namespace 360 of the ephemeral storage device, determine how much space is currently reserved within the namespace 360, and perform input/output (I/O) operations to the ephemeral storage device 355. For example, in the context of the present example, the journaling driver 321 may reserve a first partition (e.g., partition 365*a*) within the namespace 360 for maintaining an operation log journal 371 on behalf of an operation log journaling subsystem (not shown) of the virtual storage system 310 and the victim cache driver 322 may reserve a second partition (e.g., partition 365*b*) within the namespace 360 for maintaining a victim cache 372 on behave of a victim cache subsystem (not shown) of the virtual storage system 310. Non-limiting examples of NVMe driver processing and namespace sharing are described below with reference to FIGS. 4-5, respectively. Non-limiting examples of journaling driver processing, journaling driver initialization, victim cache driver processing, and victim cache driver initialization are described below with reference to FIGS. 6-9, respectively.

According to one embodiment, the management API 345 may include one or more of the functions listed in Table 1 below.

TABLE 1

Management API Functions

| Name | Purpose |
|---|---|
| Set_Consumer_NS_Sharing | Enable/disable consumer namespace sharing for a namespace of a specified NVMe controller or a specified namespace. |
| Get_Consumer_NS_Sharing | Obtain the current sharing state of a namespace of a specified NVMe controller or a specified namespace. |
| NS_Get_Consumer_Size | Obtain the size of the namespace reserved by a given consumer. |
| NS_Get_Consumer_Reserved_Sector_Cnt | Obtain the count of sectors (blocks) reserved by all consumers in a given namespace. |
| NS_Get_Consumer_Avail_Sector_Cnt | Obtain the count of available (unreserved) sectors (blocks) in a given namespace. |
| NS_Consumer_Reserve | Reserve a specified number of sectors (blocks) in a given namespace for a particular consumer, starting at a given offset. |

While for purposes of illustration examples of two specific consumers are described herein, it is to be appreciated the virtual storage system 310 may include more, fewer, or different consumers that rely on the existence of ephemeral storage as a backing store. It is also to be appreciated, read and write operations may be performed by consumers via standard I/O functions (not shown) in the NVMe driver.

While for simplicity in the context of the present example, a single ephemeral storage device (e.g., a single ephemeral disk) may represent a backing store, it is to be appreciated multiple ephemeral disks may collectively serve as the backing store for journaling and/or the victim cache. In one example, as an alternative to dividing up multiple ephemeral disks between multiple consumers (e.g., journaling and the victim cache) at the disk level, the multiple consumers may make use of a common set of disks but different partitions across the common set of disks. For example, a first partition (e.g., partition 0) may be assigned for use by the victim cache on each of the common set of disks and a second partition (e.g., partition 1) may be assigned for use by journaling on each of the common set of disk. In one embodiment, the victim cache and journaling may perform RAID 0 striping across the common set of disks using their respective assigned partitions across the common set of disks. In this manner, better utilization of the ephemeral disk storage capacity may be achieved as the partition used by the victim cache is expected to represent a relatively larger portion of the consumed storage than used by journaling.

Example NVMe Driver Processing

Figure 4:
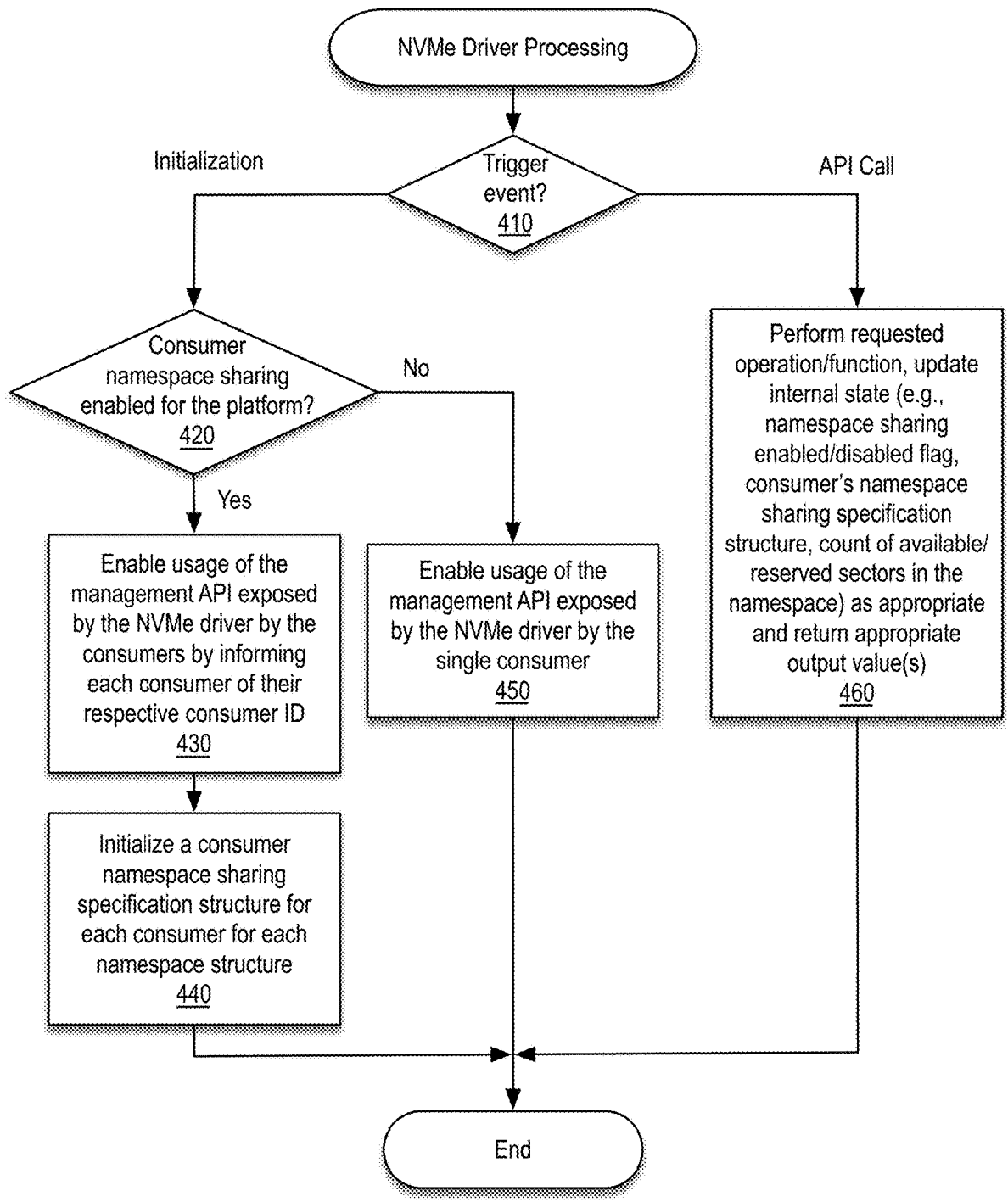
FIG. 4 is a flow diagram illustrating operations performed by an NVMe driver in accordance with an embodiment of the present disclosure.

FIG. 4 is a flow diagram illustrating operations performed by an NVMe driver (e.g., NVMe driver 340) in accordance with an embodiment of the present disclosure. In the context of the present example, when consumer namespace sharing is not enabled, it is assumed the desired behavior is for a single consumer to be entitled to make use of the entire namespace (the legacy behavior). The single consumer can be informed that it has full control of the namespace (or not) through a kernel environment variable, a system control variable, or values set in a configuration file.

At decision block 410, an appropriate processing path is taken depending on the particular event that triggered execution of the NVMe driver. If the trigger event represents initialization of the NVMe driver, processing continues with decision block 420; otherwise, if the trigger event represents receipt of a call, for example, from one of multiple potential NVMe consumers (e.g., NVMe consumers 320) via a management API (e.g., management API 345) exposed by the NVMe driver, processing continues with block 460. In one embodiment, initialization of the NVMe driver takes place during boot processing (e.g., start-up processing) of the node (e.g., one of virtual storage systems 110*a-c*, virtual storage system 210, or virtual storage system 310) with which the NVMe driver is associated.

At decision block 420, a determination is made regarding whether consumer namespace sharing is enabled for the platform. According to one embodiment, a configuration datastore (e.g., a replicated database accessible by any node of the cluster) may store a namespace sharing flag indicative of whether an administrative user has enabled or disabled consumer namespace sharing for the cluster. If consumer namespace sharing is enabled, processing continues with block 430; otherwise, processing branches to block 450.

At block 430, the NVMe driver enables usage of the management API by multiple consumers, which may include a journaling driver (e.g., journaling driver 321) and a victim cache driver (e.g., victim cache driver 322) by informing each consumer of their respective consumer ID. According to one embodiment, the NVMe driver informs a given consumer of its assigned consumer ID by calling a consumer namespace registration callback function of the given consumer. Thereafter, when the given consumer makes a request to the NVMe driver via the management API or via I/O functions supported by the NVMe driver, the consumer ID assigned to the given consumer may be provided as a parameter of the request or as part of a command structure, respectively. For example, the consumer ID may be built into the API calls of the management API as an input parameter, whereas for I/O requests, the consumer ID may represent a field of the command structure used by the consumer to submit such requests to the NVMe driver.

At block 440, the NVMe driver initializes a consumer namespace sharing specification structure for each consumer for each namespace. According to one embodiment, an array of consumer namespace sharing specification structures (indexed by the consumer ID) may be associated with each namespace. The consumer namespace sharing specification for a given consumer and a given namespace may store a representation of the logical block address (LBA) range reserved by the given consumer within the given namespace. According to one embodiment, the LBA range is represented in the form of an offset and a size. During initialization, the respective LBA ranges (e.g., the offsets and sizes) for all consumers within all namespaces may be initialized to zero.

At block 450, the NVMe driver may loop through the registered consumers and enable usage of the management API by a single consumer that is entitled to make use of the entire namespace via a single consumer ID. As noted above, the single consumer may be informed that it has full control of the namespace (or not) through a kernel environment variable, a system control variable, or values set in a configuration file. According to one embodiment, in response to the NVMe driver invoking the callback function of a given consumer, the given consumer replies with a cookie value with a NULL cookie value or a non-NULL cookie value, with the latter indicating the given consumer represents the single consumer entitled to make use of the entire namespace. Once the NVMe driver encounters this consumer, it need not call other consumers' callback functions for this namespace.

At block 460, responsive to receiving a request via the management API, the NVMe driver performs the requested operation function (e.g., one of those listed in Table 1), updates its internal state (e.g., a local namespace sharing enabled/disabled flag maintained by the NVMe driver for a given NVMe controller, the consumer's namespace sharing specification structure, the count of available/reserved sectors (blocks) in the namespace at issue, etc.) as appropriate and returns appropriate output value(s).

For example, when the API call invoked by the consumer represents enablement/disablement of consumer namespace sharing for a given NVMe controller (e.g., the Set_Consumer_NS_Sharing call of Table 1), the NVMe driver updates its internal state, which in this case may be a local namespace sharing enabled/disabled flag. Depending upon the particular implementation, once a consumer has reserved space under consumer namespace sharing, the functionality may no longer be disabled and the NVMe driver may return an error code.

When the API call invoked by the consumer represents a request for the current sharing state of a specified namespace (e.g., the Get_Consumer_NS_Sharing call of Table 1), there is no need for an update to the NVMe driver's internal state and the NVMe driver returns to the caller the local namespace sharing enabled/disabled flag corresponding to the specified NVMe controller.

When the API call invoked by the consumer represents a request for the size of the namespace reserved by a given consumer (e.g., the NS_Get_Consumer_Size call of Table 1), there is no need for an update to the NVMe driver's internal state and the NVMe driver may simply return the size of a partition reserved within a given namespace by a given consumer.

When the API call invoked by the consumer represents a request for the count of sectors (blocks) reserved by all consumers in a given namespace (e.g., the NS_Get_Consumer_Reserved_Sector_Cnt call of Table 1), there is no need for an update to the NVMe driver's internal state and the NVMe driver may iterate through the array of consumer namespace sharing specification structures to identify the number of sectors used by each consumer in the given namespace, calculate a total number of sectors, and return the total to the caller. In one embodiment, each sector may represent a block of a fixed size (e.g., 4 kibibytes (KiB)).

When the API call invoked by the consumer represents a request for the count of available (unreserved) sectors in a given namespace (e.g., the NS_Get_Consumer_Avail_Sector_Cnt call of Table 1), there is no need for an update to the NVMe driver's internal state. If consumer namespace sharing is enabled for the given namespace, the NVMe driver may iterate through the array of consumer namespace sharing specification structures to identify the number of sectors used by each consumer in the given namespace, calculate a total number of sectors used, determine the total physical size of the given namespace (the full namespace size), and return the difference between the total physical size of the given namespace and the total number of sectors used. If consumer namespace sharing is not enabled for the given namespace, then the NVMe driver may determine the total physical size of the given namespace (the full namespace size) and return that value to the caller.

When the API call invoked by the consumer represents a request to reserve a specified number of sectors in a given namespace for a particular consumer, starting at a given offset (e.g., the NS_Consumer_Reserve call of Table 1), the NVMe driver may first validate the requested number of sectors is available in the given namespace. If the validation is unsuccessful, an error code may be returned to the caller. If the validation is successful, the NVMe driver may updates its internal state, in this case the size and offset contained in the consumer namespace sharing specification structure for the particular consumer. According to one embodiment, all reservations are aligned to a particular block-size boundary (e.g., a 4 KiB boundary).

Example Namespace Sharing

Figure 5:
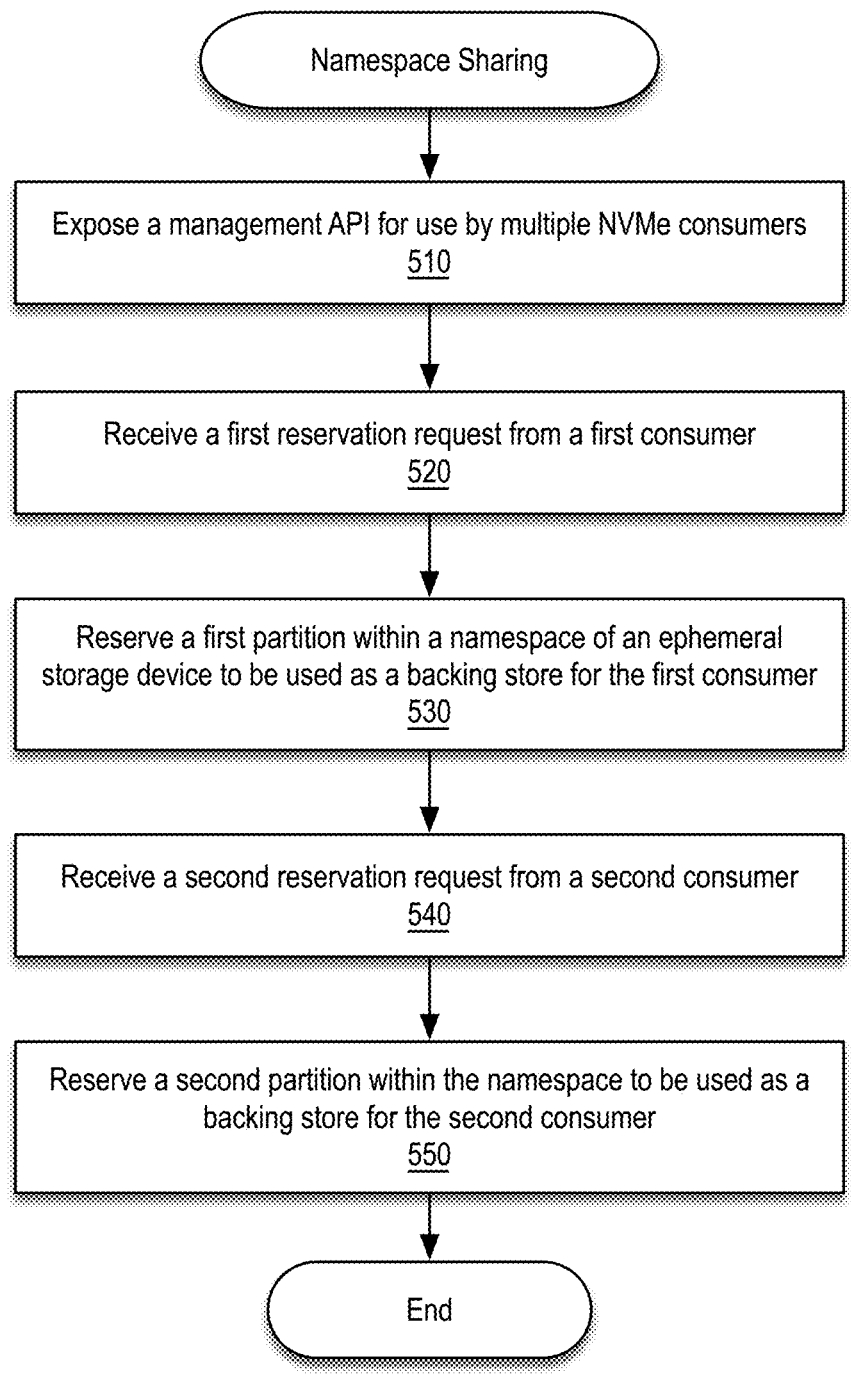
FIG. 5 is a flow diagram illustrating operations for performing namespace sharing in accordance with an embodiment of the present disclosure.

FIG. 5 is a flow diagram illustrating operations for performing namespace sharing in accordance with an embodiment of the present disclosure. The processing described with reference to FIG. 5 may be performed by an NVMe driver of a virtual storage system (e.g., one of virtual storage systems 110a-c, virtual storage system 210, or virtual storage system 310).

At block 510, the NVMe driver exposes a management API (e.g., management API 345) for use by multiple NVMe consumers (e.g., NVMe consumers 320), which may include a journaling driver (e.g., journaling driver 321) and a victim cache driver (e.g., victim cache driver 332).

At block 520, a first reservation request is received from a first consumer. The first reservation request (e.g., the NS_Consumer_Reserve call of Table 1) may specify a namespace (e.g., namespace 360) of an ephemeral storage device (e.g., ephemeral storage device 355) to be used as a backing store for the first consumer. According to one embodiment, the journaling driver may reserve a predetermined or configurable size (e.g., a specific size defined by a boot argument (an environment variable)) for the operation log journal, whereas the victim cache driver may ask for as much space is possible. In such an embodiment, it is desirable for the journaling driver to be loaded and initialized first so as to avoid the victim cache driver from reserving all available space in the namespace.

At block 530, a first partition (e.g., partition 365*a*) is reserved within the specified namespace. For example, the NVMe driver may store an offset (e.g., 0) specified as part of the first reservation request and a size (e.g., 48 gibibytes (GiB), 2 tebibyte (TiB), etc.) specified as part of the first reservation request within the consumer's namespace sharing specification structure associated with the specified namespace.

At block 540, a second reservation request is received from a second consumer. The second reservation request (e.g., the NS_Consumer_Reserve call of Table 1) may specify the same namespace as that used by the first consumer.

At block 550, a second partition (e.g., partition 365*b*) is reserved within the specified namespace. For example, the NVMe driver may store an offset (e.g., 48 GiB, 2 TiB, etc.) specified as part of the second reservation request and a size (e.g., 2.000 GiB, 1 TiB, 2 TiB. 4,048 GiB, etc.) within the consumer's namespace sharing specification structure associated with the specified namespace. As described further below, according to one embodiment, as the victim cache driver may be aware of the fact that it may be the second consumer to reserve space within the namespace, it may use information regarding the number of reserved sectors in the namespace as the specified offset and may set the specified size to the remaining portion of the namespace.

Example Journaling Driver Processing

Figure 6:
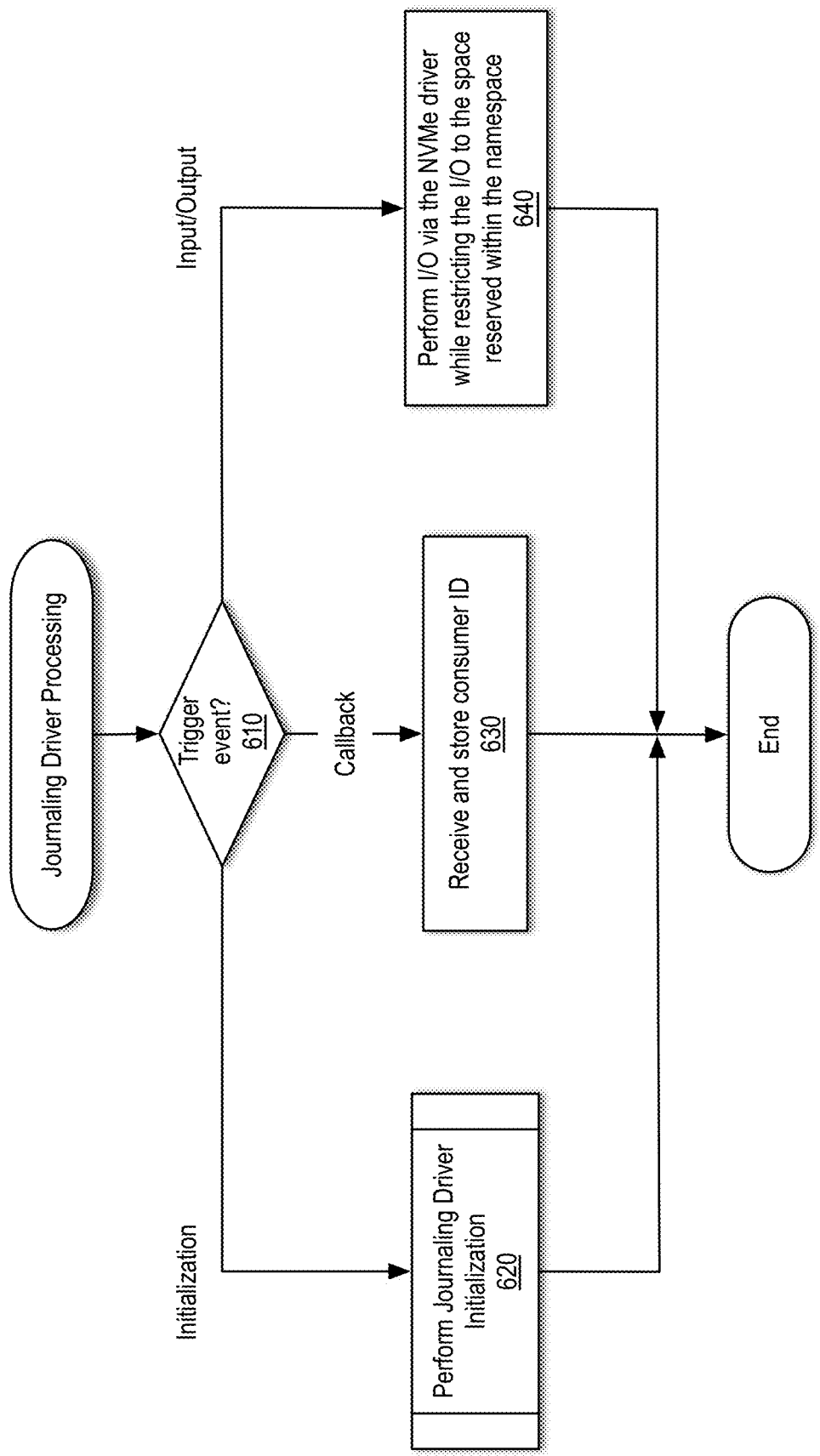
FIG. 6 is a flow diagram illustrating operations performed by a journaling driver in accordance with an embodiment of the present disclosure.

FIG. 6 is a flow diagram illustrating operations performed by a journaling driver (e.g., journaling driver 321) in accordance with an embodiment of the present disclosure. In the context of the present example, it is assumed the journaling driver represents the only consumer or one of multiple consumers (e.g., NVMe consumers 320) of a namespace (e.g., namespace 360) of an ephemeral storage device (e.g., ephemeral storage device 355).

At decision block 610, an appropriate processing path is taken depending on the particular event that triggered execution of the journaling driver. If the trigger event represents initialization of the journaling driver, processing continues with block 620. If the trigger event represents receipt of a callback, for example, to a namespace registration callback function of the journaling driver from an NVMe driver (e.g., NVMe driver 340), processing continues with block 630. If the trigger event represents a request to perform input/output (I/O) to/from the operation log journal, for example, on behalf of a journaling subsystem, processing continues with block 640.

At block 620, initialization of the journaling driver is performed. The initialization trigger event may be received by the journaling driver during boot processing.

In one embodiment, the journaling driver may be enabled by loading (and initialization) of a system module. The operating system may control the order of initialization of the different modules by, for example, giving priority to base driver modules (e.g., the NVMe driver), which may be initialized first. Other driver modules (e.g., the journaling driver, the victim cache driver, etc.) may be initialized after in a predetermined or configurable order. According to one embodiment, the journaling driver is the first consumer to be initialized after initialization of the NVMe driver. If the journaling driver is not the first consumer to be initialized, the journaling driver should at least be initialized prior to a victim cache driver (e.g., victim cache driver 322) or any other consumer that may attempt to reserve as much space as possible within the namespace so as to ensure the journaling driver is able to reserve a sufficiently sized partition (e.g., partition 365*a*) within the namespace to allow the journaling subsystem to maintain the operation log journal. A non-limiting example of journaling driver initialization is described below with reference to FIG. 7.

At block 630, the journaling driver receives and locally stores the consumer ID assigned to it by the NVMe driver. Other operations that may be performed by the consumer callback are consumer-specific, but can be categorized into some basic functions, including, for example, initializing data structures, allocating memory, querying and setting driver options/flags. It is customary for a consumer to allocate memory to store it's configuration and state, and to use that as a "cookie" that it returns to the NVMe driver. In one embodiment, when making subsequent requests to the NVMe driver via a management API (e.g., management API 345) exposed by the NVMe driver, the consumer ID may be provided to the NVMe driver, for example, as a parameter of the API call or as part of a command structure.

At block 640, the journaling driver performs any I/O requested of it by the journaling subsystem via the NVMe driver. In one embodiment, the NVMe driver may rely on an "honor" system in which the various consumers are assumed to individually restrict their respective I/Os (e.g., reads/writes) to the LBA range of the partition they have previously reserved within the namespace. Alternatively, the NVMe driver may be responsible for validating that the offset and size associated with read and write requests made by a given consumer are within the given consumer's reservation range. As described further below with reference to FIG. 8, when submitting an I/O, the consumer may be responsible for adding the reserved offset to the request sector received by the consumer.

Example Journaling Driver Initialization

Figure 7:
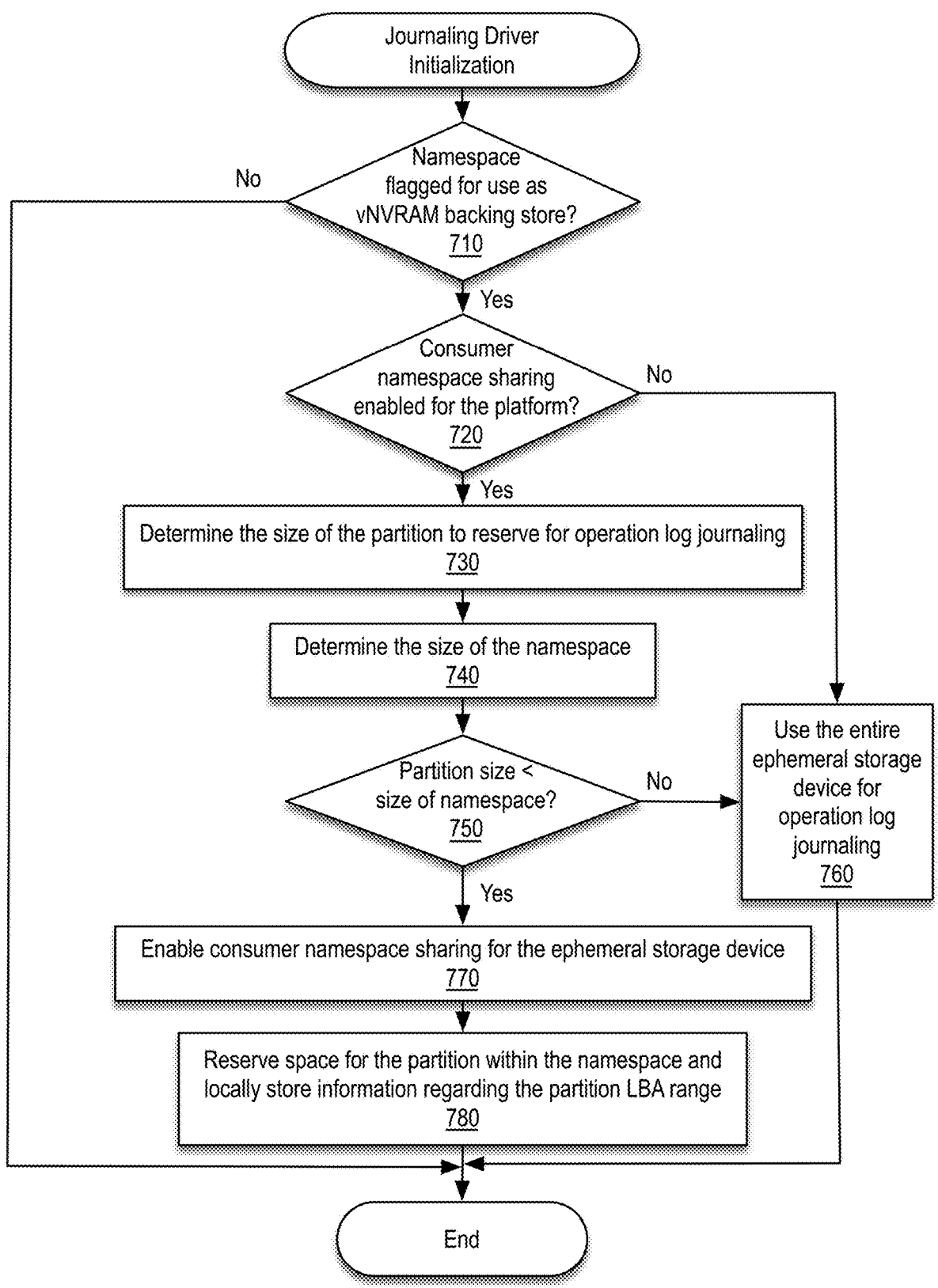
FIG. 7 is a flow diagram illustrating operations for performing journaling driver initialization in accordance with an embodiment of the present disclosure.

FIG. 7 is a flow diagram illustrating operations for performing journaling driver initialization in accordance with an embodiment of the present disclosure. In the context of the present example, the journaling driver (e.g., journaling driver 321) is assumed to have been the first consumer of one or more consumers (e.g., NVMe consumers 320) of a namespace (e.g., namespace 360) of an ephemeral storage device (e.g., ephemeral storage device 355) to have initialized and thus it is responsible for enabling namespace sharing when appropriate. Additionally, when the namespace is shared, as the journaling driver will be the first consumer to make a reservation within the namespace, its partition (e.g., partition 365*a*) is assumed to start at an offset of zero within the namespace.

At decision block 710, a determination is made regarding whether the namespace is flagged for use as a vNVRAM backing store. In one embodiment, this information (e.g., a Boolean value of true or false) may be available as a boot argument (an environment variable). If the namespace is flagged for use as a vNVRAM backing store, processing continues with decision block 720; otherwise, processing branches to the end.

At decision block 720, a determination is made regarding whether consumer namespace sharing is enabled for the platform. As noted above, in one embodiment, a configuration datastore (e.g., a replicated database accessible by any node of the cluster) may store a namespace sharing flag indicative of whether an administrative user has enabled or disabled consumer namespace sharing for the cluster. If consumer namespace sharing is enabled, processing continues with block 730; otherwise, processing branches to block 760.

At block 730, the journaling driver determines the size of the partition to reserve for operation log journaling. In one embodiment, this information (e.g., an integer value between 48 GiB and 2 TiB, inclusive) may be available as a boot argument (an environment variable).

At block 740, the journaling driver determines the size of the namespace. According to one embodiment, the journaling driver may request the size of the namespace via a management API (e.g., management API 345) exposed by an NVMe driver (e.g., NVMe driver 340). For example, the may use journaling driver the NS_Get_Consumer_Avail_Sector_Cnt call of Table 1.

At decision block 750, the journaling driver determines whether the partition size it is to reserve within the namespace (as determined in block 730) is less than the size of the namespace (as determined in block 740). If so, processing continues with block 770; otherwise, processing branches to block 760.

At block 760, consumer namespace sharing is not enabled for the ephemeral storage device by the journaling driver and instead, the journaling driver will use the entire ephemeral storage device for operation log journaling. As noted above, in one embodiment, initialization of the consumers may be performed in a particular order by the operating system. Assuming the journaling driver initialization is performed prior initialization of other consumers (e.g., the victim cache driver), when the journaling driver represents the only consumer entitled to make use of the namespace, initialization of the other consumers may be skipped, thereby disallowing other from attempting to reserve space within this namespace.

At block 770, the journaling driver enables consumer namespace sharing for the ephemeral storage device. According to one embodiment, the journaling driver requests consumer namespace sharing be enabled via the management API. For example, the journaling driver may use the Set_Consumer_NS_Sharing call of Table 1.

At block 780, the journaling driver reserves space for the partition within the namespace and locally stores information regarding the partition LBA range (e.g., an offset and a size). According to one embodiment, the journaling driver requests a partition having a size (e.g., a number of sectors) based on the partition size determined in block 730 starting at offset 0 of the namespace. For example, the journaling driver may use the NS_Consumer_Reserve call of Table 1. In an embodiment relying on the honor system, locally storing information regarding the partition LBA range may be used, for example, by the journaling driver to restrict its I/O operations to the namespace to the reserved LBA range within the namespace. In other embodiments, rather than relying on an honor system (e.g., assuming consumers will restrict their respective I/Os to the LBA range of the partition they have previously reserved within the namespace), the various functions exposed by the management API may validate that a given request offset and size falls within the reservation range for the requesting consumer, for example, by using the consumer ID of the requesting consumer to index into the consumer namespace sharing specification structure of the namespace.

Example Victim Cache Driver Processing

Figure 8:
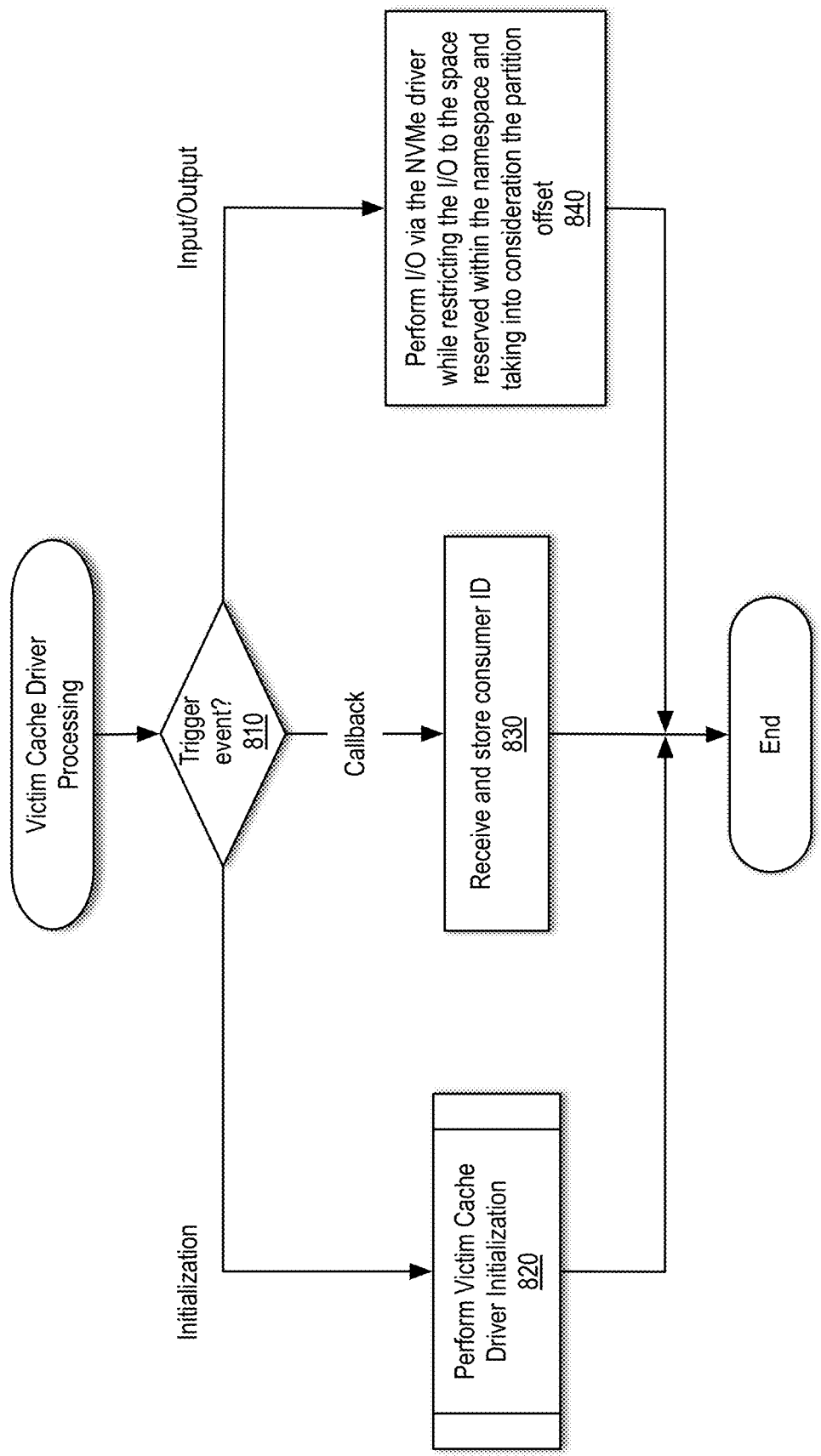
FIG. 8 is a flow diagram illustrating operations performed by a victim cache driver in accordance with an embodiment of the present disclosure.

FIG. 8 is a flow diagram illustrating operations performed by a victim cache driver (e.g., victim cache driver 322) in accordance with an embodiment of the present disclosure. In the context of the present example, it is assumed the victim cache driver represents one of multiple consumers (e.g., NVMe consumers 320) of a namespace (e.g., namespace 360) of an ephemeral storage device (e.g., ephemeral storage device 355).

At decision block 810, an appropriate processing path is taken depending on the particular event that triggered execution of the victim cache driver. If the trigger event represents initialization of the victim cache driver, processing continues with block 820. If the trigger event represents receipt of a callback, for example, to a namespace registration callback function of the victim cache driver from an NVMe driver (e.g., NVMe driver 340), processing continues with block 830. If the trigger event represents a request to perform input/output (I/O) to/from the victim cache, for example, on behalf of a victim cache subsystem, processing continues with block 840.

At block 820, initialization of the victim cache driver is performed. The initialization trigger event may be received by the victim cache driver during boot processing. According to one embodiment, during initialization, the victim cache driver seeks to reserve a partition (e.g., partition 365b) having as much space as possible within the namespace to facilitate effective maintenance of a victim cache by a victim cache subsystem. Given the victim cache driver's inclination to attempt to reserve as much space as possible within the namespace, a journaling driver (e.g., journaling driver 321) should be initialized prior to the victim cache driver so as to ensure the journaling driver is able to reserve a sufficiently sized partition (e.g., partition 365a) within the namespace to allow the journaling subsystem to maintain the operation log journal. A non-limiting example of victim cache driver initialization is described below with reference to FIG. 9.

At block 830, the victim cache driver receives and locally stores the consumer ID assigned to it by the NVMe driver. In one embodiment, when making subsequent requests to the NVMe driver via a management API (e.g., management API 345) exposed by the NVMe driver, the consumer ID may be provided to the NVMe driver, for example, as a parameter of the API call or as part of a command structure.

At block 840, the victim cache driver performs any I/O requested of it by the victim cache subsystem via the NVMe driver. As noted above, in one embodiment, the NVMe driver may rely on an "honor" system in which the various consumers are assumed to individually restrict their respective I/Os (e.g., reads/writes) to the LBA range of the partition they have previously reserved within the namespace. Alternatively, the NVMe driver may be responsible for validating that the offset and size associated with read and write requests made by a given consumer are within the given consumer's reservation range.

As noted above, when submitting an I/O, consumers may be responsible for adding the reserved offset to the request sector received by the consumer (e.g., from a respective subsystem on behalf of which the consumer provides access to ephemeral storage). For example, assuming the victim cache driver's partition begins at offset 100 within the namespace and the victim cache driver has received a request from the victim cache subsystem to perform a write of size 100 starting at LBA 10, the victim cache driver should issue a write request of size 100 to the namespace starting at LBA 110.

Example Victim Cache Driver Initialization

Figure 9:
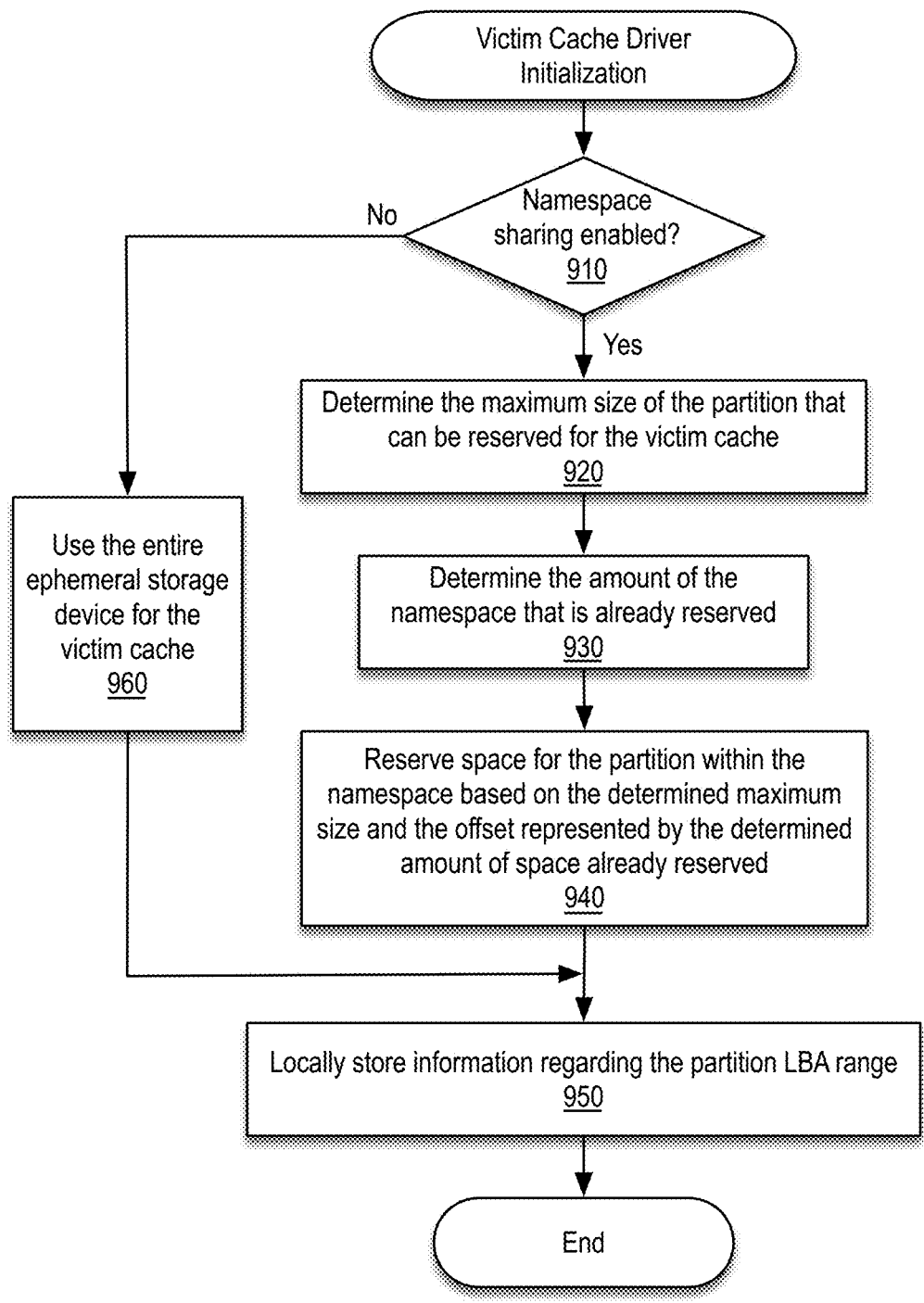
FIG. 9 is a flow diagram illustrating operations for performing victim cache driver initialization in accordance with an embodiment of the present disclosure.

FIG. 9 is a flow diagram illustrating operations for performing victim cache driver initialization in accordance with an embodiment of the present disclosure. In the context of the present example, when consumer namespace sharing is not enabled, the victim cache driver (e.g., victim cache driver 322) is assumed to be the only consumer of multiple consumers (e.g., NVMe consumers 320) entitled to utilize a namespace (e.g., namespace 360) of an ephemeral storage device (e.g., ephemeral storage device 355), for example, as a result of the victim cache driver being the only consumer to have been initialized during boot processing. When consumer namespace sharing is enabled, the victim cache driver is assumed to be the second or subsequent consumer of multiple consumers of the namespace to have initialized. Thus, it is assumed consumer namespace sharing will have already been enabled by the time the victim cache driver initialization processing is performed. Additionally, when the namespace is shared, as the victim cache driver will not be the first consumer to make a reservation within the namespace, its partition (e.g., partition 365b) is assumed to start at an offset representing the first LBA within the namespace following any previously reserved partitions. For example, assuming a journaling driver (e.g., journaling driver 321) represents the first consumer to have initialized and reserved a partition (e.g., partition 365a) within the namespace of 12 sectors of size 4 KiB representing LBAs 0-11 in the namespace, the victim cache driver's partition will start at offset 12.

At decision block 910, a determination is made regarding whether namespace sharing has been enabled for the namespace. According to one embodiment, the victim cache driver may request information regarding the current sharing sate of namespace via a management API (e.g., management API 345) exposed by an NVMe driver (e.g., NVMe driver 340). For example, the victim cache driver may use the Get_Consumer_NS_Sharing call of Table 1). If consumer namespace sharing is enabled for the namespace, processing continues with block 920; otherwise, processing branches to block 960.

At block 920, the victim cache driver determines the maximum size of the partition that can be reserved for the victim cache. According to one embodiment, the victim cache driver may request via the management API the count of available (unreserved) sectors remaining in the namespace. For example, the victim cache driver may use the NS_Get_Consumer_Avail_Sector_Cnt call of Table 1.

At block 930, the victim cache driver determines the amount of the namespace that is already reserved, for example, by other consumers. According to one embodiment, the victim cache driver may request via the management API the count of reserved sectors in the namespace. For example, the victim cache driver may use the NS_Get_Consumer_Reserved_Sector_Cnt call of Table 1.

At block 940, the victim cache driver may reserve all remaining available space within the namespace for its partition, for example, based on the determined maximum size from block 920 and the offset represented by the determined amount of space already reserved within the namespace from block 930. According to one embodiment, the victim cache driver may request via the management API a reservation for a specified number of sectors in the namespace starting at the offset. For example, the victim cache driver may use the NS_Consumer_Reserve call of Table 1.

At block 950, the victim cache driver locally stores information regarding the partition LBA range (e.g., the offset and the size). In an embodiment relying on the honor system, locally storing information regarding the partition LBA range may be used, for example, by the victim cache driver to restrict its I/O operations to the namespace to the reserved LBA range within the namespace. As noted above, in other embodiments, the various functions exposed by the management API may validate that a given request offset and size falls within the reservation range for the requesting consumer, for example, by using the consumer ID of the requesting consumer to index into the consumer namespace sharing specification structure of the namespace.

At block 960, the victim cache driver will use the entire ephemeral storage device for the victim cache. For example, the offset and the size for the partition may be set to 0 and the namespace size, respectively. As noted above, in one embodiment, initialization of the consumers may be performed in a particular order by the operating system. Assuming the victim cache driver initialization is performed prior initialization of other consumers (e.g., the journaling driver), when the victim cache driver represents the only consumer entitled to make use of the namespace, initialization of the other consumers may be skipped, thereby disallowing other from attempting to reserve space within this namespace.

While in the context of the flow diagrams of FIGS. 4-9, a number of enumerated blocks are included, it is to be understood that examples may include additional blocks before, after, and/or in between the enumerated blocks. Similarly, in some examples, one or more of the enumerated blocks may be omitted and/or performed in a different order.

Ephemeral Storage Device Overprovisioning

In modern flash-based devices, a pool of free blocks should generally be maintained to improve write performance by allowing new data to be written to available blocks, thus allowing the blocks with old data to be freed (erased) in the background. By having a large enough pool of free blocks, the device's controller can both erase fewer blocks and is provided with the flexibility to choose which block to erase, thereby providing a longer life for the device.

Over-provisioning refers to the ability to provision more blocks in the device compared to the number of data blocks actually used to hold data. Depending on the particular implementation, a management API (e.g., management API 345) exposed by an NVMe driver (e.g., NVMe driver 340) may implement device overprovisioning by:

Having consumers leave unreserved space in the device; or

Utilizing a dedicated "overprovisioning consumer," which may be operable to reserve space on the device that will not be used for I/O.

Consumer Quality of Service/Prioritization

According to one embodiment, a namespace that is shared by multiple consumers may have one or more of the mechanisms to prioritize I/O and preserve quality-of-service, including, but not limited to, an outstanding operation limit and/or a throughput limit. The outstanding operation limit may be implemented by providing a given consumer with the ability to put a limit on the number of outstanding operations in the device for the given consumer. When the given consumer issues more operations than its limit, the excess operations may be placed on a queue and held until the outstanding operation(s) complete on the device. The throughput limit may be implemented by providing a given consumer with the ability to put a limit on the number of units of storage (e.g., bytes) that the device can process in a unit of time (e.g., one second). Any operations in excess of the limit may be queued and issued once the throughput is reduced to a value below the limit. In one embodiment, different outstanding operation limits and/or throughput limits may be specified for read and write operations.

According to one embodiment, for the outstanding operation limit mechanism, a high priority consumer (e.g., journaling driver 321) may have no limitations, while a low priority consumer (e.g., victim cache driver 322) can be limited down to a single outstanding operation at a time.

Similarly, for the throughput limit, the high priority consumer may have no limitations on throughput, whereas the low priority consumer can be limited to a fraction of the available throughput of the ephemeral storage device. For example, if the ephemeral storage device has a 1 GB/s throughput limit, and it is desired to allow the high priority consumer to consume no less that 900 MB/s of throughput, then the low priority consumer throughput limit may be set to 100 MB/s.

In one embodiment, one or both of the outstanding operations limits or the throughput limits may be dynamic, for example, based on the measured utilization of the ephemeral storage device by the high priority consumer. For example, ff the high priority consumer is not accessing the ephemeral storage device much, then the limits on the low priority device may be increased temporarily, yielding a "burst" of performance.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 10:
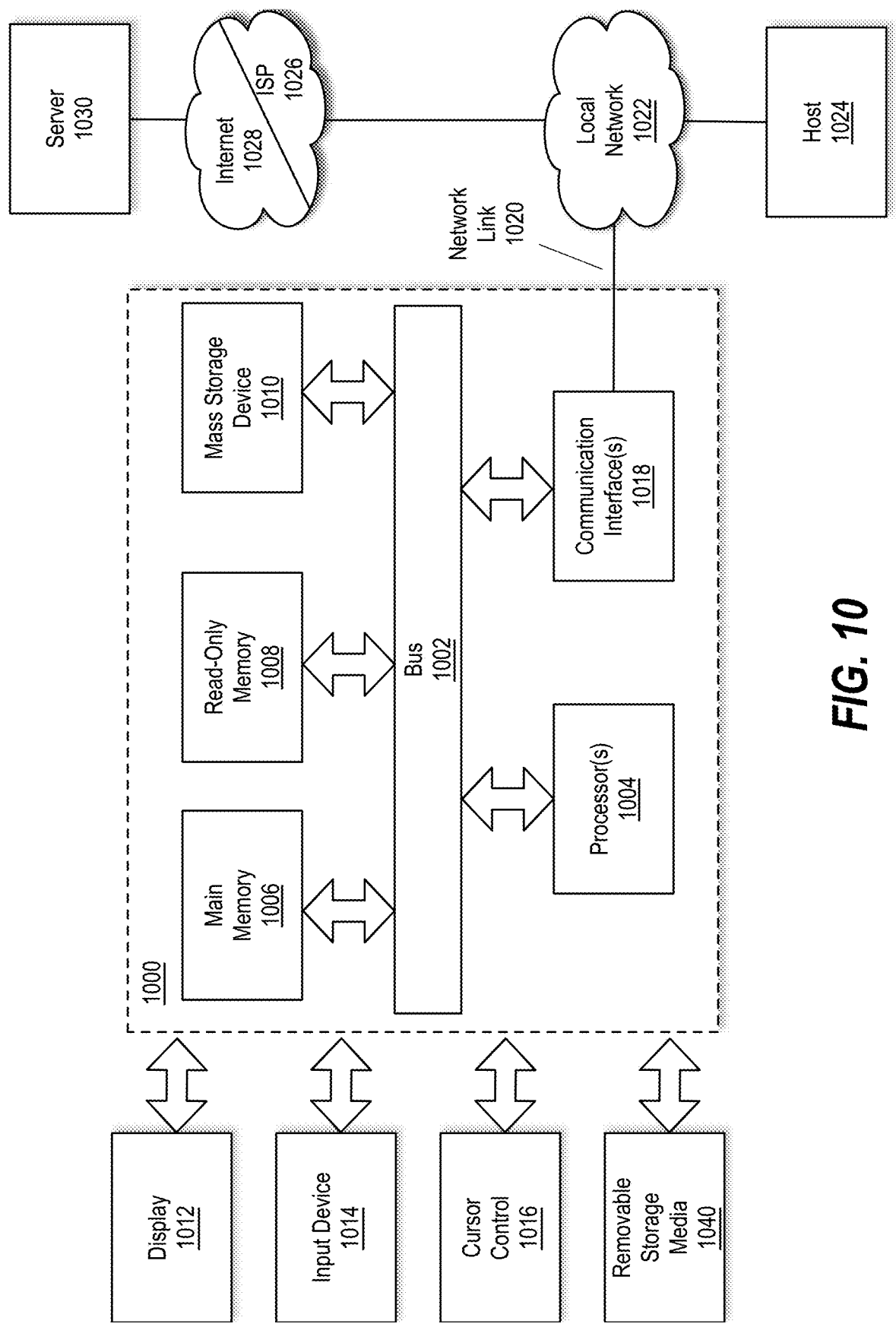
FIG. 10 illustrates an example computer system in which or with which embodiments of the present disclosure may be utilized.

FIG. 10 is a block diagram that illustrates a computer system 1000 in which or with which an embodiment of the present disclosure may be implemented. Computer system 1000 may be representative of all or a portion of the computing resources of a physical host (e.g., host 200) on which a virtual storage system (e.g., one of virtual storage systems 110a-c, virtual storage system 210, or virtual storage system 310) of a distributed storage system (cluster) is deployed. Notably, components of computer system 1000 described herein are meant only to exemplify various possibilities. In no way should example computer system 1000 limit the scope of the present disclosure. In the context of the present example, computer system 1000 includes a bus 1002 or other communication mechanism for communicating information, and a processing resource (e.g., a hardware processor 1004) coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, e.g., a magnetic disk, optical disk or flash disk (made of flash memory chips), is provided and coupled to bus 1002 for storing information and instructions.

Computer system 1000 may be coupled via bus 1002 to a display 1012, e.g., a cathode ray tube (CRT), Liquid Crystal Display (LCD), Organic Light-Emitting Diode Display (OLED), Digital Light Processing Display (DLP) or the like, for displaying information to a computer user. An input device 1014, including alphanumeric and other keys, is coupled to bus 1002 for communicating information and command selections to processor 1004. Another type of user input device is cursor control 1016, such as a mouse, a trackball, a trackpad, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Removable storage media 1040 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1000 may implement the techniques described herein using customized hard-wired logic, one or more ASICs or FPGAs, firmware or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1010. Volatile media includes dynamic memory, such as main memory 1006. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, or stored in storage device 1010, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   exposing, by a non-volatile memory express (NVMe) driver of a virtual storage system deployed within a compute instance of a cloud environment, an application programming interface (API) through which a plurality of consumers of the virtual storage system access an ephemeral storage device associated with the compute instance; and
   facilitating sharing by the plurality of consumers of a namespace of the ephemeral storage device by:
     reserving, by the NVMe driver, a first partition within the namespace to be used as a backing store by a first consumer of the plurality of consumers based on a first reservation request received via the API from the first consumer; and
     reserving, by the NVMe driver, a second partition within the namespace to be used as a backing store by a second consumer of the plurality of consumers based on a second reservation request received via the API from the second consumer.

2. The method of claim 1, further comprising for each consumer of the plurality of consumers:
   maintaining, by the NVMe driver, a consumer identifier (ID), an offset within the namespace at which a respective partition of the consumer starts, and a size of the respective partition; and
   informing, by the NVMe driver, the consumer of the consumer ID for the consumer by calling a registration callback function of the consumer.

3. The method of claim 1, wherein the first consumer comprises a journaling driver operable to maintain an operation log journal within the first partition and the second consumer comprises a victim cache driver operable to maintain a victim cache within the second partition.

4. The method of claim 3, further comprising, prior to the first reservation request:
issuing, by the journaling driver via the API, a request regarding a size of the namespace;
determining, by the journaling driver, the size of the namespace is greater than a predetermined or configurable size of the first partition; and
responsive to the determination that size of the namespace is greater than the predetermined or configurable size of the first partition, enabling, by the journaling driver, sharing of the namespace by invoking the API.

5. The method of claim 4, wherein the first reservation request identifies a range of logical block addresses (LBAs) based on a starting offset of the first partition within the namespace and the predetermined or configurable size of the first partition.

6. The method of claim 3, further comprising, prior to the second reservation request:
determining, by the victim cache driver via the API, whether sharing of the namespace is enabled;
responsive to the determination that sharing of the namespace is enabled:
determining, by the victim cache driver via the API, a maximum size of the second partition that can be created within the namespace; and
determining, by the victim cache driver via the API, a number of reserved sectors in the namespace.

7. The method of claim 6, wherein the second reservation request identifies a range of LBAs based on a starting offset of the second partition within the namespace represented by the determined number of reserved sectors and a size of the second partition represented by the determined maximum size.

8. A virtual storage system comprising:
one or more processing resources; and
instructions that when executed by the one or more processing resources cause the virtual storage system to:
expose, by a non-volatile memory express (NVMe) driver of the virtual storage system deployed within a compute instance of a cloud environment, an application programming interface (API) through which a plurality of consumers of the virtual storage system access an ephemeral storage device associated with the compute instance; and
facilitate sharing by the plurality of consumers of a namespace of the ephemeral storage device by:
reserving, by the NVMe driver, a first partition within the namespace to be used as a backing store by a first consumer of the plurality of consumers based on a first reservation request received via the API from the first consumer; and
reserving, by the NVMe driver, a second partition within the namespace to be used as a backing store by a second consumer of the plurality of consumers based on a second reservation request received via the API from the second consumer.

9. The virtual storage system of claim 8, wherein the instructions further cause the virtual storage system to for each consumer of the plurality of consumers:
maintain, by the NVMe driver, a consumer identifier (ID), an offset within the namespace at which a respective partition of the consumer starts, and a size of the respective partition; and
inform, by the NVMe driver, the consumer of the consumer ID for the consumer by calling a registration callback function of the consumer.

10. The virtual storage system of claim 8, wherein the first consumer comprises a journaling driver operable to maintain an operation log journal within the first partition and the second consumer comprises a victim cache driver operable to maintain a victim cache within the second partition.

11. The virtual storage system of claim 10, wherein the instructions further cause the virtual storage system to, prior to the first reservation request:
issue, by the journaling driver via the API, a request regarding a size of the namespace;
determine, by the journaling driver, the size of the namespace is greater than a predetermined or configurable size of the first partition; and
responsive to the determination that size of the namespace is greater than the predetermined or configurable size of the first partition, enable, by the journaling driver, sharing of the namespace by invoking the API.

12. The virtual storage system of claim 11, wherein the first reservation request identifies a range of logical block addresses (LBAs) based on a starting offset of the first partition within the namespace and the predetermined or configurable size of the first partition.

13. The virtual storage system of claim 10, wherein the instructions further cause the virtual storage system to, prior to the second reservation request:
determine, by the victim cache driver via the API, whether sharing of the namespace is enabled;
responsive to the determination that sharing of the namespace is enabled:
determine, by the victim cache driver via the API, a maximum size of the second partition that can be created within the namespace; and
determine, by the victim cache driver via the API, a number of reserved sectors in the namespace.

14. The virtual storage system of claim 13, wherein the second reservation request identifies a range of LBAs based on a starting offset of the second partition within the namespace represented by the determined number of reserved sectors and a size of the second partition represented by the determined maximum size.

15. A non-transitory machine readable medium storing instructions, which when executed by one or more processing resources of a virtual storage system deployed within a compute instance of a cloud environment, cause the virtual storage system to:
expose, by a non-volatile memory express (NVMe) driver of the virtual storage system an application programming interface (API) through which a plurality of consumers of the virtual storage system access an ephemeral storage device associated with the compute instance; and
facilitate sharing by the plurality of consumers of a namespace of the ephemeral storage device by:
reserving, by the NVMe driver, a first partition within the namespace to be used as a backing store by a first consumer of the plurality of consumers based on a first reservation request received via the API from the first consumer; and
reserving, by the NVMe driver, a second partition within the namespace to be used as a backing store by a second consumer of the plurality of consumers based on a second reservation request received via the API from the second consumer.

16. The non-transitory machine readable medium of claim 15, wherein the instructions further cause the virtual storage system to for each consumer of the plurality of consumers:
    maintain, by the NVMe driver, a consumer identifier (ID), an offset within the namespace at which a respective partition of the consumer starts, and a size of the respective partition; and
    inform, by the NVMe driver, the consumer of the consumer ID for the consumer by calling a registration callback function of the consumer.

17. The non-transitory machine readable medium of claim 15, wherein the first consumer comprises a journaling driver operable to maintain an operation log journal within the first partition and the second consumer comprises a victim cache driver operable to maintain a victim cache within the second partition.

18. The non-transitory machine readable medium of claim 17, wherein the instructions further cause the virtual storage system to, prior to the first reservation request:
    issue, by the journaling driver via the API, a request regarding a size of the namespace;
    determine, by the journaling driver, the size of the namespace is greater than a predetermined or configurable size of the first partition; and
    responsive to the determination that size of the namespace is greater than the predetermined or configurable size of the first partition, enable, by the journaling driver, sharing of the namespace by invoking the API.

19. The non-transitory machine readable medium of claim 18, wherein the first reservation request identifies a range of logical block addresses (LBAs) based on a starting offset of the first partition within the namespace and the predetermined or configurable size of the first partition.

20. The non-transitory machine readable medium of claim 17, wherein the instructions further cause the virtual storage system to, prior to the second reservation request:
    determine, by the victim cache driver via the API, whether sharing of the namespace is enabled;
    responsive to the determination that sharing of the namespace is enabled:
    determine, by the victim cache driver via the API, a maximum size of the second partition that can be created within the namespace; and
    determine, by the victim cache driver via the API, a number of reserved sectors in the namespace.

* * * * *